United States Patent
Woram

(10) Patent No.: US 9,340,246 B2
(45) Date of Patent: May 17, 2016

(54) BICYCLE BRAKE LIGHT WITH GRADUATED DECELERATION DEPENDENT LIGHTING

(71) Applicant: John Desmond Woram, Humble, TX (US)

(72) Inventor: John Desmond Woram, Humble, TX (US)

(*) Notice: Subject to any disclaimer, the term of this patent is extended or adjusted under 35 U.S.C. 154(b) by 0 days.

(21) Appl. No.: 14/267,114

(22) Filed: May 1, 2014

(65) Prior Publication Data

US 2015/0314823 A1 Nov. 5, 2015

(51) Int. Cl.
*B62J 3/00* (2006.01)
*B62J 6/04* (2006.01)
*B62J 6/00* (2006.01)

(52) U.S. Cl.
CPC ... *B62J 6/04* (2013.01); *B62J 6/001* (2013.01)

(58) Field of Classification Search
CPC .......................................................... B60Q 1/50
USPC .................. 340/432, 463, 466, 467, 468, 469
See application file for complete search history.

(56) References Cited

U.S. PATENT DOCUMENTS

| | | | |
|---|---|---|---|
| 2,507,420 A | 5/1950 | Phillips | |
| 3,906,443 A | 9/1975 | Musselmann | |
| 4,031,343 A | 6/1977 | Sopko | |
| 4,899,023 A | 2/1990 | Shu-Hwa | |
| 5,089,805 A | 2/1992 | Salsman | |
| 5,121,100 A * | 6/1992 | Gallo | 340/467 |
| 5,384,693 A | 1/1995 | Schwaller | |
| 5,526,240 A | 6/1996 | Kuu | |
| 5,690,410 A | 11/1997 | Lin | |
| 5,801,629 A | 9/1998 | Lehmann | |
| 6,020,814 A * | 2/2000 | Robert | 340/467 |
| 6,249,219 B1 | 6/2001 | Perez | |
| 6,753,769 B1 | 6/2004 | Elliott | |
| 6,933,836 B2 | 8/2005 | Hsu | |
| 7,170,402 B2 | 1/2007 | Bracken | |
| 7,649,447 B2 | 1/2010 | Lu | |
| 8,502,652 B2 | 8/2013 | Su | |
| 8,622,595 B2 | 1/2014 | Chen | |
| 2002/0154008 A1 | 10/2002 | Wu | |
| 2004/0008106 A1 | 1/2004 | Konezal | |
| 2005/0099277 A1 | 5/2005 | Hsu | |
| 2005/0200470 A1 | 9/2005 | Bracken | |
| 2006/0012471 A1 | 1/2006 | Ross | |
| 2007/0205885 A1 | 9/2007 | Lu | |
| 2008/0088423 A1* | 4/2008 | Liu | 340/432 |
| 2008/0122596 A1 | 5/2008 | Montagnon | |
| 2010/0085180 A1 | 4/2010 | Mathis | |
| 2010/0225459 A1 | 9/2010 | Lee | |
| 2011/0057781 A1 | 3/2011 | Lee | |
| 2011/0084822 A1 | 4/2011 | Li | |
| 2011/0148611 A1 | 6/2011 | Ni | |
| 2011/0304455 A1 | 12/2011 | Kisiel | |

(Continued)

*Primary Examiner* — Toan N Pham

(74) *Attorney, Agent, or Firm* — William C. Yarbrough, III

(57) ABSTRACT

A bicycle brake light system with a graduated light display that is activated as a direct result of and in correlation with the degree of bicycle deceleration. The brake lamp lights are illuminated in a graduated sequence resulting from a predetermined range from slight deceleration to hard breaking that is conveyed visually through the number and color of illuminated lamps. The brake lamp assemblage interface calculates deceleration algorithmically through a magnet and sensor receptor and receiving programmable logic controller that receives, computes, and conveys a bicycle wheel's decreasing revolutions per unit of time optically through illuminating lights to fellow vehicle operators and pedestrians.

13 Claims, 3 Drawing Sheets

(56) References Cited

U.S. PATENT DOCUMENTS

| | | |
|---|---|---|
| 2012/0007727 A1 | 1/2012 | Lin |
| 2012/0739995 | 1/2012 | Bingle |
| 2012/0200402 A1 | 8/2012 | Loveless |
| 2012/0242471 A1 | 9/2012 | Tsai |
| 2012/0249316 A1 | 10/2012 | Morrow |
| 2012/0249317 A1 | 10/2012 | Wang |
| 2013/0033370 A1 | 2/2013 | Langlois |
| 2013/0307678 A1 | 11/2013 | Ransom |

* cited by examiner

BICYCLE BRAKE LIGHT WITH GRADUATED DECELERATION DEPENDENT LIGHTING

BACKGROUND OF THE INVENTION

1. Field of the Invention

The present invention relates to a bicycle brake light system, and more particularly, to an improved brake light warning system whereby a series of brake lamps are activated and illuminated in a graduated manner dependent directly on the amount of deceleration of a bicycle as perceived, interpreted, and transmitted via a programmable logic circuit to rearward-facing illuminatable lamps.

2. Background of the Invention

Visual and verbal signaling have long been used customarily by recreational and professional bicycle riders in the form of hand gestures (hand pointing down with palm facing rearward) and vocal warnings ("slowing" and "stopping") as an improvement over relying exclusively on a trailing rider's perception of an advance rider's deceleration. Yet, of the two forms of signaling, visual signaling has experienced the lion's share of attention in the form of rearward facing electrical lighting devices that illuminate to indicate the deceleration or stopping of a vehicle, both motorized and non-motorized. It is true that the most ubiquitous of these are in the area of motorized vehicles and many examples have been elucidated in the literature. Yet, in the field of non-motorized, human-powered vehicles, the conditions in which bicycle riders operate (e.g. slipstream drafting in close relation and proximity to other riders), the exposure to untoward collisions with other riders, and the disadvantage and vulnerability of riders to surrounding motorized vehicles begs the need for a warning system that conveys immediate and accurate deceleration information. In short, advancements in visual signaling are an absolute requirement in assuring the safety of an ever increasing population of bicycle operators.

In bicycling, it is routine to attach a rearward facing illuminating lamp, a "brake light", to the rear of a bicycle to provide braking information to approaching vehicles, both automotive and cycling, and pedestrians. In its simplest form, a rear mounted lamp is manually activated through a compressible hand brake and wire system where the hand brake is attached to the handlebar of a bicycle and designed to run parallel to the handlebar grips at the most distal portion of the bar. The cyclist, to initiate deceleration, compresses the hand brake which causes a connected wire to be drawn taught. The pulling force from the activated wire actuates U-shaped brake calipers to forcibly engage and grip the bicycle rim resulting in deceleration. The manual act of deceleration activates any one of a number of mechanisms to facilitate positive lamp illumination. Yet, while several designs and assemblages for brake lights exist, all systems convey the same essential information. Fundamentally, bicycle brake lights are basically dyadic in nature where the brake light is either illuminated or not illuminated depending on the presence or absence of deceleration thus resulting in a single intensity illuminated signal.

As can be seen in classic brake lamp examples, as disclosed by Musselman in U.S. Pat. No. 3,906,443 and Sopko in U.S. Pat. No. 4,031,343, the manual slowing of the bicycle through brake caliper compression is the basis for the electrical activation of a brake light and subsequent brake light illumination. Specifically, Musselman utilizes the contact between the wheel rim and electrical contact brushes to complete a circuit to actuate lamp illumination. Sopko similarly utilizes contraction of the brake calipers to slidably engaged a threaded sleeve and piston system to complete a circuit and energize a brake bulb. Clearly, each is reliant upon manual deceleration and exemplifies single intensity illumination.

Further, modifications have been made to brake lighting systems that enhance their self-sustainability. As depicted in Pub. No. US 2012/0249316 by Morrow et al., the presented brake light system not only utilizes brake compression to initiate brake bulb illumination, but also makes use of the friction created between the slowing bicycle wheel and a spinning brake wheel to create the electrical current necessary to power the light itself. Again, although an improvement on the functionality of the brake, the Morrow invention is still dependant on the physicality of deceleration and displays simply the fact that the rider has activated the brake with no indication as to a degree or grade of deceleration.

Improvements on basic wired designs are also prevalent. As depicted in U.S. Pat. No. 8,622,595 issued to Chen, the basic wired brake light compression unit gives way to a wireless assembly comprised of a controller device capable of emitting a signal to the brake lamp receiving unit to generate a light signal from the brake lamp. Too, the brake lamp unit incorporates the addition of a right and left turn signal into the lamp assemblage to notify following motor and foot traffic of the bicycle driver's intern to turn and in which direction the driver will be going. Yet, even with improved technological advances and further augmentation to information displayed, the critical information of degrees of deceleration remains absent.

Additionally, progress also exists in the related area of quantifying the amount of deceleration of a vehicle, albeit in a motorized version. As enumerated in U.S. Pat. No. 6,249,219 issued to Perez et al., the breaking system of a motor-driven vehicle can be modified to initiate a brake light upon deceleration and to enhance the signal with a pulse rate commensurate with the degree of deceleration. Utilizing an accelerometer, the Perez's brake warning system measures the rate of deceleration through deceleration forces (G forces). This system, though, fails to properly take into account the gravitational effect of the weight and total effect of positional gravity (i.e. in a downward slope) and therefore lacks the sensitivity required for a bike braking system to be completely accurate. U.S. Pat. No. 7,649,447 issued to Lu has sought to overcome the deficiencies of Perez's invention by incorporating motion into Lu's invention. Lu too incorporates an accelerometer, but in a markedly different manner. The '447 patent utilizes a control circuits unit that monitors the movement of the bicycle and disallows specific signals (i.e. due to G-forces created when a bicycle is stationary on a downward slope). In addition, the '447 patent invention functions to indicate breaking on a decline despite the acceleration experienced by the bicycle and the unit itself due to gravity on a downward slope. Yet, while Lu overcomes Perez's sensitivity shortcomings, his resolution is exceedingly complex (incorporating control circuits, micro-controllers, and multiple deceleration modes) and is design-specific to motorized vehicle deceleration. What's more, while Lu's invention may have the capability to delineate between severe and light braking, up to and including finite degrees of braking in between, the invention does not precisely convey that information to the following motorist or pedestrian—an attribute quintessentially crucial to the immediate invention.

Finally, wide-ranging modalities have been incorporated into automotive braking systems that seek to address the need for more accurate and timely deceleration information. Publication No. US 2011/0304455 (Automotive Brake Light With Graduated Display) as discussed by Kisiel, has sought to improve upon the infirmities of previous inventions by developing an automotive graduated lamp display that interprets and rearwardly displays deceleration information in a graduated or graded manner via use of an accelerometer. Kisiel's invention is an improvement over the invention described by Mathis in U.S. Patent Application No. 2010/0085180 that seeks to use the mechanical pressure generated in various braking situations to reflect the rate of deceleration via the use of a rheostat (potentiometer) that converts pressure into voltage and displays more pressure as greater illumination via increases in voltage. It is too a marked decidedly discernible improvement over the structured invention posed in U.S. Pat. No. 6,753,769 issued to Elliott that utilizes a complex interpretation of decreased accelerator pressure depression and increased brake pedal actuation to convey light to moderate to heavy braking as a function of the automobile driver's passive deceleration and active braking actions. Yet, each of these inventions is specifically designed for use in an automobile and is not easily relatable to use in a bicycle where bicycle riders trail intentionally closely to take advantage of "drafting" and therefore operate at much shorter distances and within a greatly decreased time with which to act and react to deceleration. Plainly, the mantra of increased distances between vehicles as speed increases in automotive traffic is not directly transferable to bicycle riding where close formations in groups or "pelotons" remains constant even with increased speeds. It is this differentiation that is paramount to the utility of the present invention.

While many endeavors exist to convey real time braking information in both motorized vehicles and bicycles to following traffic, none yet has accomplished the communication of such information in a manner that is both accurate and timely in terms of bicycle deceleration. This invention seeks to resolve the issue of transmitting specific, discreet and timely information to following traffic in the form of an ergonomic, wireless deceleration display system.

BRIEF SUMMARY OF THE INVENTION

The present invention relates to a means of offering an improved method for providing precise and timely bicycle deceleration information to following vehicle operators and pedestrians through a rearward facing brake lamp. This is achieved through a multi-bulbed, vertically oriented assemblage that displays an increased number of illuminated bulbs related directly and proportionally to the degree of bicycle deceleration. The decreasing speed and therefore the amount of deceleration is determined by a specifically-positioned circularly moving magnet attached to a rear wheel bicycle spoke and a corresponding pickup sensor moveably fixed to the brake lamp unit, which is attached to a fixed point on the bicycle frame (a rear down fork). With each pass of the positioned magnet, one wheel revolution is recorded. A Programmable Logic Controller (PLC) utilizes an algorithm to determine if the speed of the bicycle is increasing, fixed, or decreasing, based on the number of wheel revolutions per unit of time (seconds or minutes). When the bicycle has positive or zero acceleration, the lights remain off. Yet, when it is determined via the algorithm that the rate of deceleration of the bicycle is positive, that information is displayed visually in a graduated manner dependant on the rate of deceleration through a predetermined number of brake light bulb illuminations.

In one embodiment, the lights of the brake assemblage which can be light emitting diodes (LEDs) or incandescent and constructed of either glass, plastic, or similar material and are arranged vertically on the rearward face of the brake light assemblage. The spoke magnet and sensor are precisely oriented in such a manner as to allow the sensor to receive optimal revolution input from the magnet with each tire revolution. The PLC receives, interprets, and displays information visually through increasing and decreasing currents and a graduated light illumination.

Another embodiment of the present invention may exhibit a brake lighting system where the lights are of any number of shapes and orientations where the arrangement of the lights may be circular, horizontal, or arranged in an array or configuration so that the idea of conveying information related to graduated deceleration is conveyed to a following vehicle operator or pedestrian.

DETAILED DESCRIPTION OF THE INVENTION

The following detailed description is of the best currently contemplated modes of carrying out exemplary embodiments of the present invention. The description is not to be taken in a limiting sense, but rather is made merely for the purpose of illustrating the general principles of the invention, since the scope of the invention is best defined by the appended claims and diagrams.

Figure 1:
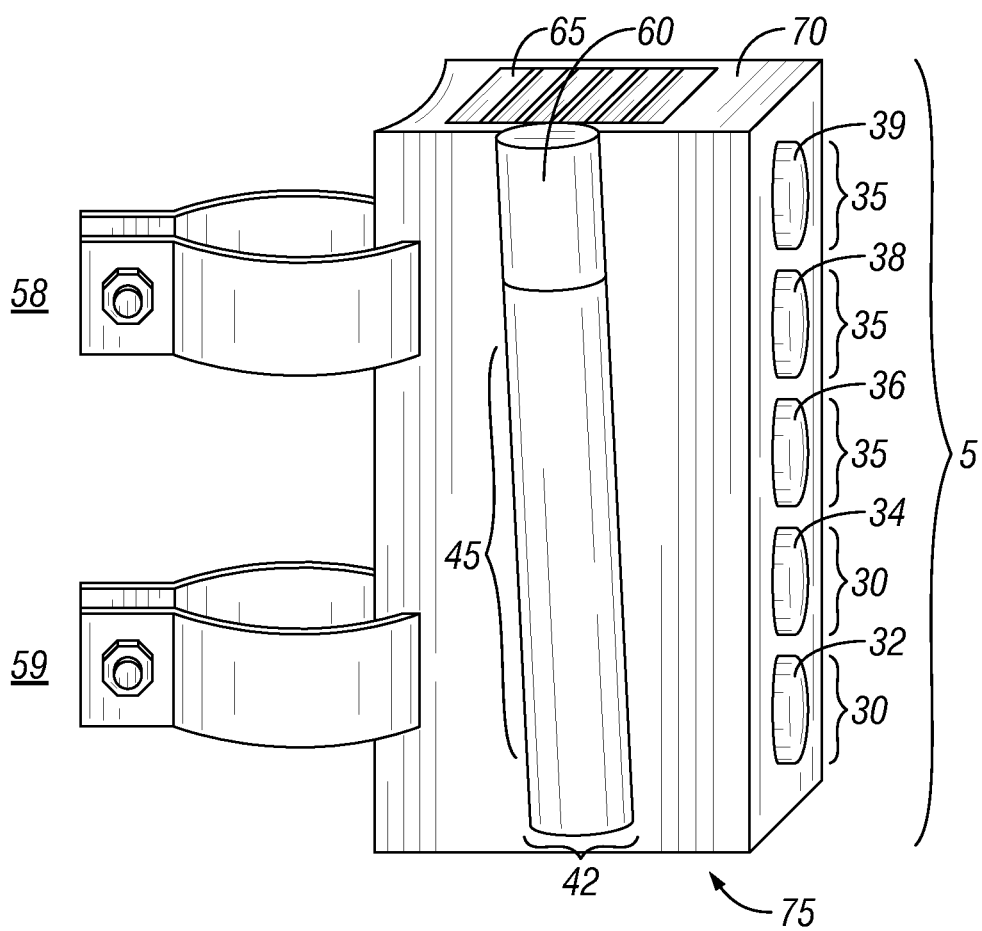
FIG. 1—A detailed elevated perspective schematic side view of the bike brake.
Figure 2:
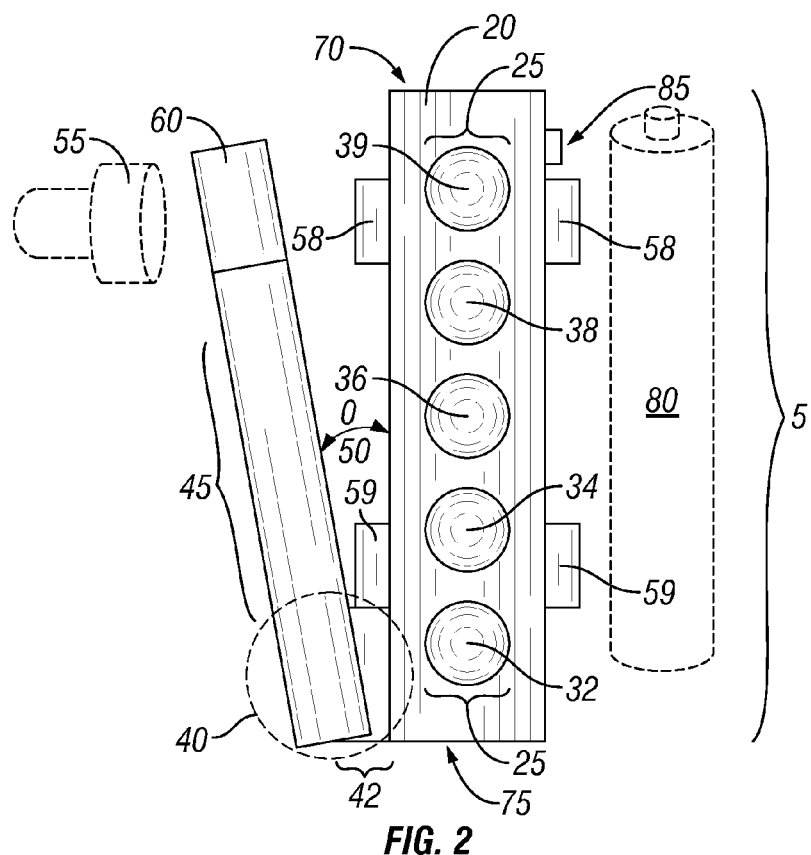
FIG. 2—illustrates the rearward facing front view of the bike brake of FIG. 1.

Broadly, one embodiment of the present invention provides a bicycle brake warning system in FIGS. 1 and 2 engineered for the attachment to the rear of a bicycle frame fork via two "C" clamps 58, 59 which is designed to utilize 5 (five) lights—2 (two) orange lights 30 and 3 (three) red lights 35—to indicate to following traffic the degree of bicycle deceleration where slight deceleration is displayed by the illumination of 1 (one) orange bulb 32, more intense deceleration may activate 2 (two) orange bulbs 32 and 34, moderate deceleration may activate 2 (two) orange bulbs and 1 (one) red bulb 32,34, and 36, more severe deceleration may activate 2 (two) orange bulbs and 2 (two) red bulbs 32, 34 36 and 38, and very rapid deceleration may activate all 5 (five) bulbs including 2 (two) orange bulbs and 3 (three) red bulbs 32, 34, 36, 38, and 39.

Figure 4:
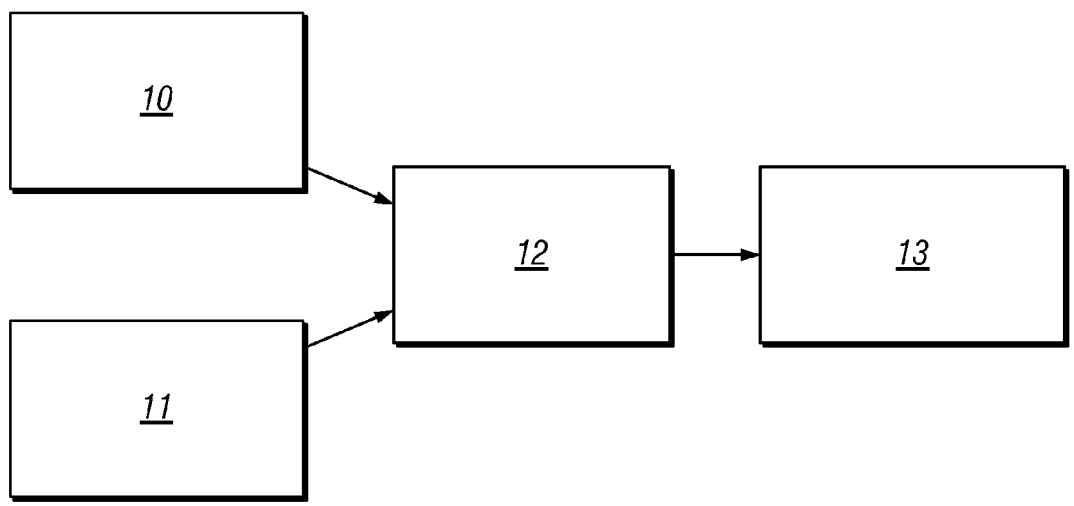
FIG. 4—Programmable Logic controller (PLC).

As depicted in FIGS. 1 and 2, the device's outer casing 5 harbors an decelerometer mechanism (not shown) in the form of a Programmable Logic Controller (PLC) 12 in FIG. 4 that incorporates a rotation magnet sensing sensor 60 capable of detecting the bicycle speed (S) in terms of bicycle wheel revolutions per unit of time (in tenths of seconds) 10 where each wheel revolution 11 is a known distance (the wheel circumference), interpreting and quantifying the rate of positive, zero, and negative deceleration based on a set algorithm making use of Rates of Change (ROC) where the ROC is determined by $S_{current}$ minus $S_{previous}$ divided by time in seconds, and displaying the information visually via a brake light 13 by generating a current commiserate with the rate of deceleration and illuminating a predetermined number of bulbs 30,35 based on the rate of deceleration where slight deceleration leads to the activation of fewer bulbs and more rapid deceleration leads to more bulb illumination. It should be particularly noted that the aforementioned calculation may be exercised without regard to wheel size or circumference.

The following examples are given to further illustrate the invention. The actual deceleration ranges can be adjusted through test trials to achieve the best results.

TABLE 1

ROC and Illuminated Lights

| Rate of deceleration | Illuminated Lights | Type of Deceleration |
|---|---|---|
| <1% | 0 | Acceleration |
| 1%-5% | 0 | "Noise" |
| 6%-10% | 1 (1 orange) | Coasting |
| 11%-20% | 2 (2 orange) | Soft Braking |
| 21%-30% | 3 (2 orange, 1 red) | Moderate Braking |
| 31%-40% | 4 (2 orange, 2 red) | Moderate-Hard Braking |
| >40% | 5 (2 orange, 3 red) | Hard Braking |

TABLE 2

Deceleration Scenarios

| Deceleration Type | Current Speed | ROC | Number of Lights |
|---|---|---|---|
| Coasting | 20 mph | (20 − 19)/1 second = −1 | 1 |
| Soft Braking | 18 mph | (18 − 16)/1 second = −2 | 2 |
| Moderate Braking | 18 mph | (18 − 14)/1 second = −4 | 3 |
| Moderate-hard Braking | 16 mph | (16 − 10)/1 second = −6 | 4 |
| Hard Braking | 16 mph | (16 − 8)/1 second = −8 | 5 |

In operation, the PLC 12 of FIG. 4 is capable of receiving, interpreting, and conveying the received information visually via illumination of orange bulb set 30 and red bulb set 35 of brake light 13 based on rates of negative acceleration (deceleration). Most preferably, the PLC 12 is capable of filtering through specious input/noise when receiving information and once activated will stay illuminated for a set time period up to and including 5 seconds. Further, upon receiving information of zero or positive acceleration, the PLC 12 is capable of either disallowing or discontinuing light illumination.

FIGS. 1 and 2 show the face 20 of the outer casing 5 exhibiting five (5) circular orifices 25 placed vertically and designed to receive two (2) orange bulbs 30 placed in a vertical arrangement—one orange bulb 32 adjacent to and inferior to the next orange bulb 34 and three (3) red bulbs 35 placed in a vertical arrangement—where red bulb 36 is adjacent to and superior to orange bulb 34, red bulb 38 adjacent to and superior to red bulb 36, and red bulb 39 adjacent to and superior to red bulb 38. Preferably, the bulbs are either light emitting diodes (LEDs) or incandescent bulbs capable of receiving electric current from the interface PLC 12. As illustrated, the lower portion of the outer casing 5 incorporates a swivel extension unit 40 attached to movable arm 45 at the point most proximal 42 to the outer casing 5 that is both inwardly and outwardly moveable at such an angle 50 as to allow the maximum receiving magnetic output from magnet 55 by sensor 60. Correspondingly, the receiving sensor 60 is connected to the most distal portion of the movable arm 45 allowing for manipulation and adjustment to create the most advantageous reception sensitivity.

Figure 3:
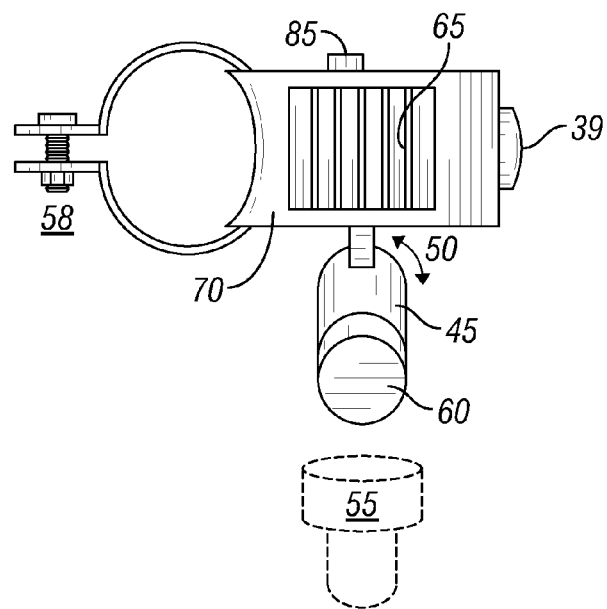
FIG. 3—top view of the invention of FIG. 1.

FIGS. 1 and 3 display a side perspective and top view of the invention wherein the outer casing 5 manifests an open and closable waterproof lid 65 that serves as an opening into the outer casing 5 and is designed to open into a cavity that runs the distance from outer casing top 70 to outer casing bottom 75 and is designed to receive a power source in the form of a "AA" battery 80, or other appropriately sized battery power source. In addition. FIGS. 2 and 3 depict the outer casing 5 which demonstrates an "on/off" switch 85 that allows the invention operator a battery saving option when the invention is not in use.

It should be understood, of course, that the foregoing description is illustrative only and is not limited to the specific construction and arrangement as displayed and described and that the present invention representation relates to exemplary embodiments of the invention. Further, modifications as to position and placement up to and including a mirror image or a superior invention location and lamp sizes, arrangements, number and configuration revisions may be made without departing from the spirit and scope of the invention. Accordingly, the invention is best described and defined as set forth in the following claims.

What is claimed is:

1. A bicycle brake light system comprising:
   a light assembly unit having a rearward facing multi-bulb display:
   an adjustable swivel arm attached to said light assembly oriented inward toward a rear wheel spoke;
   a pickup sensor housed within the adjustable swivel arm at a point most distal to said light assembly unit:
   an open and closable hatch on top of said light assembly unit for insertion of a battery power source;
   a switch installed on a most outward portion of the light assembly for activation of an on/off switch;
   a magnet which is attached to a rear wheel spoke m such a manner as to allow for optimal detection by the pickup sensor:
   a point of attachment to a bicycle frame of a bicycle via "C" clamps and positioned as to allow for sensor reception of said magnet; and
   a PLC interface between the pickup sensor and a multi-bulb display that receives wheel revolutions, records time, and uses those as inputs to calculate discrete rates of deceleration and displays this information through activation of a plurality of rear-ward facing bulbs in a graduated manner based on differing degrees of deceleration based on logic pre-programmed into the PLC (Programmable Logic Controller).

2. The bicycle brake light system of claim 1 wherein the multi-bulb display is arranged vertically.

3. The bicycle brake light system of claim 1 wherein the multi-bulb display is arranged horizontally.

4. The bicycle brake light system of claim 1 wherein the bulbs of the multi-bulb display are round.

5. The bicycle brake light system of claim 1 wherein the bulbs of the multi-bulb display are one of a number of geometric shapes, including, but not limited to, oval, square, triangular, hexagonal, diamond, or rectangular.

6. The bicycle brake light system of claim 1 where the interface receives, interprets and displays rates of deceleration based on a preset algorithm where slight deceleration may activate one rearward facing bulb, more intense deceleration may activate two rearward facing bulbs, moderate deceleration may activate three rearward facing bulbs, more severe deceleration may illuminate four rearward facing bulbs, and very rapid deceleration or stopping may illuminate all bulbs.

7. The bicycle brake light system of claim 1 where the rearward facing multi-bulb system is comprised of:
   two orange bulbs stacked one on top of another; and
   three red bulbs stacked one on top of another with all red bulbs superior to inferior orange bulbs in order from bottom to top: orange, orange, red, red, and red.

8. The bicycle brake light system of claim 1 wherein the interface may activate a graduated display in an increasing order as follows: slight deceleration is displayed by illumination of one orange bulb, more intense deceleration may activate two orange bulbs, moderate deceleration may activate two orange bulbs and one red bulb, more severe deceleration may activate two orange bulbs and two red bulbs, and very rapid deceleration or stopping may activate all bulbs including two orange bulbs and three red bulbs.

9. An interface between a sensor and illuminable lights which forms a Programmable Logic Controller (PLC) unit which utilizes number of revolutions per unit of time (measured in seconds or tenths of seconds) on a wheel of any circumference to determine rates of negative acceleration where a positive number indicates acceleration and a negative number indicates deceleration or slowing and said rates of negative acceleration are used to determine an appropriate number of exterior illuminable lamps to activate based on a following acceleration and deceleration calculation formula:

Rate of acceleration=$RPS_{current(T)}-RPS_{prevous(T-1)}$

Where RPS is number of wheel revolutions per second, and
T=current time, and
T−1=the current time minus 1 second (prior reading).

10. The PLC interface of claim 9 which utilizes a set algorithm to differentiate between positive acceleration, zero acceleration, and degrees of negative acceleration (deceleration), and displays that information in a visually graduated, multi-bulb display based on the following algorithm:

```
//==========================================================
// Main program: loop
//==========================================================
void loop( )
{
   long stamp = millis( ) >> 1; // work in 500ths of a second - enables signed long arithmetic
   if (hallEffectInterrupt)
   {
      hallEffectInterupt = false;      // reset interupt flag
      long period = stamp − prevStamp;
      if (period>0)       // only -ve when overflow after 50 days or so!
      {
         long acceleration;
         if (prevPeriod > 0)
            acceleration = ((prevPeriod − period) * 100) / prevPeriod;
         else
            acceleration = 0;
         prevStamp = stamp;
         prevPeriod = period;
         int numLights = 0;
         if (acceleration >= 0)
            numLights = 0;
         else if (acceleration < −1 && acceleration >= −5)
            numLights = 1;
         else if (acceleration < −5 && acceleration >= −10)
            numLights = 2;
         else if (acceleration < −10 && acceleration >= −15)
            numLights = 3;
         else if (acceleration < −15 && acceleration >= −20)
            numLights = 4;
         else if (acceleration < −20)
            numLights = 5;
         illuminate(numLights);
      }
   }
   if ((stamp−prevStamp) > 1000)         // if we haven't had an interrput for 1 seconds then we must have stopped
   {
      prevStamp = 0;
      prevPeriod = 0;
      illuminate(0);
   }
}
//==========================================================
// interrupt handling
//==========================================================
void ( )
{
   hallEffectInterupt = true;
}
//==========================================================
// support functions
//==========================================================
void illuminate(int numLights)
{
   digitalWrite(orangeLED0, numLights >= 1 ? HIGH: LOW);
   digitalWrite(orangeLED1, numLights >= 2 ? HIGH: LOW);
   digitalWrite(redLED2, numLights >= 3 ? HIGH: LOW);
   digitalWrite(redLED3, numLights >= 4 ? HIGH: LOW);
   digitalWrite(redLED4, numLights >= 5 ? HIGH: LOW);
}.
```

11. The PLC interface of claim 9 which receives positive acceleration and zero acceleration and interprets each as requiring no visual display.

12. The PLC interface of claim 9 wherein illuminable lamps are turned off based on positive acceleration, or negative acceleration followed by zero acceleration for greater than or equal to 5 seconds.

13. The PLC interface of claim 9 wherein said calculation of deceleration and acceleration is a function of time and rate of change and is not affected by wheel circumference and/or wheel diameter.

* * * * *